F. L. CLARKSON & O. P. HUMMON.
FISH LURE.
APPLICATION FILED AUG. 1, 1913.
1,131,909.
Patented Mar. 16, 1915.
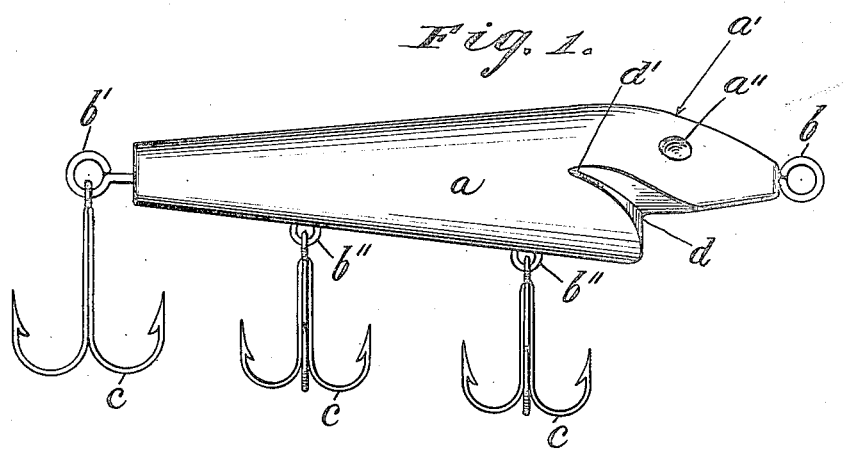
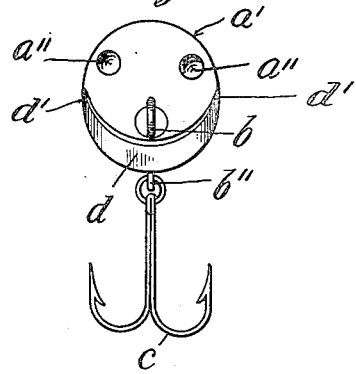

UNITED STATES PATENT OFFICE.

FLORIAN L. CLARKSON AND OSCAR P. HUMMON, OF LEIPSIC, OHIO, ASSIGNORS TO THE ENTERPRISE MANUFACTURING COMPANY, OF AKRON, OHIO, A CORPORATION OF OHIO.

FISH-LURE.

1,131,909.  Specification of Letters Patent.  Patented Mar. 16, 1915.

Application filed August 1, 1913. Serial No. 782,435.

*To all whom it may concern:*

Be it known that we, FLORIAN L. CLARKSON and OSCAR P. HUMMON, citizens of the United States of America, residing at Leipsic, in the county of Putnam and State of Ohio, have invented certain new and useful Improvements in Fish-Lures, of which the following is a specification, reference being had to the accompanying drawings.

This invention relates to improvements in fish-baits or fish-lures, and the primary object of the invention is to provide a device of this character which will simulate, as far as possible, the appearance and movement of a live bait, to the end that the same will possess unusual "killing" qualities.

The foregoing object is accomplished by constructing the bait body to closely resemble the body of a live bait and provided with a rabbeted front lower end from which extend rearwardly and upwardly-arranged grooves, the sides of which serve as planes when the bait is drawn through water to cause the bait to dive in the manner of natural fish, and further, to provide the front end of the bait with air-containing cavities, resembling in appearance eye-sockets, but which will, in the diving operation, imprison or pocket a small portion of air, which is released when the bait resumes a horizontal position, and the air escaping in fine bubbles to the surface, produces a result closely resembling the breathing action or exhalation of a fish.

With the foregoing, and other objects in view, the invention consists in the novel construction, combination and arrangement of parts constituting the invention to be hereinafter specifically described and illustrated in the accompanying drawings which form a part hereof wherein is shown the preferred embodiment of the invention, but it is to be understood that changes, variations and modifications can be resorted to which come within the scope of the matter hereinafter claimed.

In the drawings in which similar reference numerals indicate like parts in the different figures, Figure 1, is a view in side elevation of a fish-bait or lure, embodying this invention; and, Fig. 2, is a front end elevation of the same.

The body $a$ of the fish-lure is shaped somewhat like a minnow or other small fish, and is provided in the front end thereof with a screw-eye $b$ and at the rear end with a screw-eye $b'$. The front screw-eye $b$ serves as a point of attachment for the draft line, while to the rear screw-eye $b'$ is attached a cluster fish-hook $c$. Along the median line of the under side of the body portion $a$ are a pair of screw-eyes $b''$ to which are attached cluster-hoods $c$. In the head $a'$ of the body portion $a$ are a pair of recesses or cavities $a''$ which under ordinary circumstances, are positioned to simulate or resemble eye-sockets, but under ordinary circumstances, no instrumentalities are placed in these sockets, they being left open at their forward ends and closed at their rear ends for a purpose to be later described. Extending transversely across the under half of the front end of the bait is a rabbeted portion $d$ which is to simulate or resemble, as far as possible, the mouth of a fish, with the portion below the rabbeted portion corresponding to the lower jaw of a live fish and the portion above the rabbeted portion, the upper jaw thereof. Extending rearwardly and upwardly from the lateral termini of the rabbeted portion $d$ are grooves $d'$ preferably stopping short of the upper portion of the body portion $a$ and with the side walls of the grooves $d'$ constituting planes for a purpose to be later described.

In operation, this fish-lure is used in the same general manner as all artificial bait, that is to say, by drawing the same through the water, the action of drawing the bait causing the water to engage the inclined walls of the channels $d'$ which constitute planes for this purpose, resulting in a lowering or diving motion of the bait below the surface of the water, thereby obviating the use of weights to sink the lure the required distance. At the same time, the bait body is maintained in its proper position by the weight of the cluster-hoods $c$ depending from its lower median line which serve as ballast for this purpose. The action of the bait during the diving operation creates to a certain extent, a commotion in the water, and the water passing laterally through the channels $d'$ is broken up into small eddies and a whirling action is obtained to attract the attention of the fish to be caught.

The diving operation of the fish usually takes place with the head in a more or less lowered position and as the bait leaves the surface of the water on which it normally floats, the cavities or the sockets a" have a tendency more or less to pocket or imprison a small volume of air, which is held therein throughout the diving operation, but as the bait body resumes a horizontal position or turns to rise to the surface upon the termination of a rapid drawing movement of the draft line, the imprisoned air within the cavity of eye-socket a" is released in minute bubbles, which rise to the surface, giving the appearance of the breathing action of a live fish or the exhalation therefrom, thereby providing a more life-like and natural bait than would be possible were these eye-sockets not present.

I claim:—

1. An artificial bait or lure comprising a one-piece body portion of buoyant material having the lower front end thereof transversely rabbeted with the front end of the lower portion terminating a considerable distance rearwardly of the front end of the upper portion to form a shoulder, said front upper and lower portion simulating the upper and lower jaws of a natural fish, said body portion at the sides thereof further provided with rearwardly and upwardly-inclined grooves extending from the corners of said shoulder and with their opposite termini widely separated, the side walls of said grooves inclined toward each other to constitute planes for assisting in the diving operation of the bait.

2. An artificial bait or lure comprising a one-piece body of buoyant material provided near one end with an open-ended recess of proper formation and of sufficient depth to imprison or pocket a quantity of air therein during the diving operation, the walls of said cavity being so disposed with respect to the outer face of the body portion of the bait as to permit the escape of air when said bait is below the surface of the water and in an approximately horizontal position.

Signed at said Leipsic, Ohio, this twenty-fourth day of July, A. D., 1913, in the presence of the two undersigned witnesses.

FLORIAN L. CLARKSON.
OSCAR P. HUMMON.

Witnesses:
A. A. SLAYBAUGH,
F. M. HUMMON.